United States Patent [19]

Earl et al.

[11] Patent Number: 5,385,754
[45] Date of Patent: Jan. 31, 1995

[54] TREATMENT OF LIGNOCELLULOSIC MATERIALS

[75] Inventors: Harold A. Earl, Clwyd; Richard J. Salisbury, Gwynedd, both of United Kingdom

[73] Assignee: BP Chemicals Limited, London, United Kingdom

[21] Appl. No.: 123,534

[22] Filed: Sep. 17, 1993

[30] Foreign Application Priority Data

Sep. 29, 1992 [GB] United Kingdom ................ 9220503

[51] Int. Cl.$^6$ ............................................. B05D 7/00
[52] U.S. Cl. ................... 427/221; 156/331.3; 156/331.7; 156/335; 162/164.6; 162/165; 162/167; 264/331.19; 264/331.22
[58] Field of Search ......................... 156/328, 330–339, 156/331.3, 331.7, 335; 162/164.6, 165, 166, 167; 427/221, 391; 264/331.19, 331.22

[56] References Cited

U.S. PATENT DOCUMENTS

| Re. 24,003 | 5/1955 | Ericks | 117/140 |
|---|---|---|---|
| 2,140,981 | 12/1938 | Booty | 21/49 |
| 2,417,995 | 3/1947 | Stamm et al. | 117/118 |
| 4,486,475 | 12/1984 | Shutov et al. | 427/351 |
| 4,524,164 | 6/1985 | Viswanathan et al. | 156/328 X |

FOREIGN PATENT DOCUMENTS

| 00663160 | 11/1986 | European Pat. Off. |
| 0213252 | 3/1987 | European Pat. Off. |
| 57-159810 | 10/1982 | Japan |
| 58-148747 | 9/1983 | Japan |
| 2-273202 | 11/1990 | Japan |
| 2136004 | 9/1984 | United Kingdom |

OTHER PUBLICATIONS

Rowell, R et al, "The Chemistry of Solid Wood", American Chemical Society, (1984) pp. 186 and 208.
Popper et al, Holz Roh Werkst (1972) 30 (8), pp. 289–294; (1973), 31 (2), pp. 65–70; and (1975) 33(11). pp. 415–419.

Primary Examiner—Michael Lusignan
Attorney, Agent, or Firm—Brooks Haidt Haffner & Delahunty

[57] ABSTRACT

This invention relates to a process for modifying lignocellulosic materials by a chemical treatment comprising treating the material sequentially or simultaneously with phthalic anhydride and a thermosetting resin at elevated temperature, and finally heat lignocellulosic material so produced can be formed into shapes or molds having excellent dimensional stability.

14 Claims, No Drawings

TREATMENT OF LIGNOCELLULOSIC MATERIALS

The present invention relates to a process for modifying Lignocellulosic materials, especially wood e.g. in its shredded or particulate form to improve physical properties thereof.

It is well known in the art to modify wood by treating it with acetic acid and/or acetic anhydride in order to improve various physical properties of the wood such as the dimensional stability thereof. Such processes are claimed and described in a number of published patents such as e.g. EP-A-0 213 252, U.S. Pat. No. 2,417,995 and EP-A-0 063 160. It is also known to treat wood with phthalic anhydride to improve its physical properties. Such a method is reviewed in a book entitled "The Chemistry of Solid Wood" Ed by Rowell, R et al and published by the American Chemical Society, 1984 page 186. This book lists a number of references on page 208 including inter alia Popper, R et al in Holz Roh-Werkst.: 1972, 30(8), 289–94; 1973, 31(2), 65–70; and 1975, 33(11), 415–19.

These articles, however, point out that the effect of phthalic anhydride treatment is not long lasting and that the phthalic anhydride is hydrolysed and/or leached out from the wood when in contact with water.

It is also known from U.S. Pat. No. 2,140,981 and U.S. Pat. No. 4,486,475 to modify wood by impregnation with an aqueous solution of a thermosetting resin such as e.g. a phenol-formaldehyde resin. The problem with this method is that the wood so treated produces a product which does not have sufficient dimensional stability and water repellancy. Moreover, most of these use urea formaldehyde resins which are inferior to phenol-formaldehyde resins.

U.S. Reissue describes a process for treating preformed boards from wood type cellulosic material which are impregnated with phthalic annhydride and/or a thermosetting resin such as e.g. a phenolaldehyde resins.

It has now been found that such lignocellulosic materials can be treated with a combination of aromatic anhydrides and resins to obtain the relevant improvement in its properties prior to being formed into a board.

Accordingly, the present invention is a process for modifying lignocellulosic material (hereafter "LM") by a chemical treatment method, said method comprising treating the LM sequentially or simultaneously with:
a. phthalic anhydride and
b. a thermosetting resin, and
heat curing the phthalylated, resin-impregnated product so formed.

The LM to be treated can be any wood capable of being treated in the above manner including inter alia chips, flakes, splinters, strands, shreds, shives, fibres and which, after the treatment according to the invention, is capable of being shaped e.g. into a board, flat sheet, or other moulded product by shaping techniques well known in the art such as agglomeration using a suitable binding agent and one or more of heat, pressure, humidity, catalyst etc. The LM used is suitably wood which is preferably in the form of particles or shreds.

The treatment of the LM with phthalic anhydride and the thermosetting resin can be carried out sequentially or simultaneously. By this is meant that the wood may be treated with phthalic anhydride and the thermosetting resin in any sequence or by using a mixture of the two or by applying these two components simultaneously on to the LM. Each of the two components may be used as solid powders, individually as a solution in a solvent or as as solution of both in a single solvent. For instance, the phthalic anhydride (hereafter "PA") used is usually a solid and can be used in a form which enables uniform distribution over the LM being treated. Thus PA may be in the form of a powder, can be used in its molten form or as a solution or dispersion in a non-aqueous solvent but is is most preferably used in the form of a free flowing powder. Where it is used in the form of a powder, said powder suitably has an average particle size. The amount of PA used is suitably in the range from 1 to 50% w/w, preferably from 5 to 25% w/w based on the LM.

Where the treatment is carried out sequentially i.e. by treating the LM first with phthalic anhydride, the LM is suitably dried e.g. in an oven and then brought into contact with the PA by forming an intimate mixture of the two and the mixture is then cooked in a closed, suitably unsealed vessel at elevated temperature for a short duration. The drying process is carried out for a duration until there is no further loss of weight of the LM on extended drying. The desired degree of drying is usually achieved by drying for 1 hour at 105° C.

The cooking process is suitably carried out at an elevated temperature which may be suitably at least 100° C., preferably at least 140° C. and more preferably in the range from 150°–180° C.

The cooking procedure may last from about 0.5 hr to about 5 hours depending upon the type of LM treated, the amount of PA used and the cooking temperature used. In any event, the cooking step should be carried out until the LM has a substantially constant weight.

Thereafter, the cooking is stopped and the contents of the vessel brought to ambient temperature. The above procedure is preferably conducted in such a manner that the LM has a weight gain of at least 15%, suitably at least 20% and preferably 25% upon completion of this step. The PA may optionally be combined with other known components such as insecticides, pesticides, perfumes or delivery systems used in the art for treating LM in step (a).

The resultant phthalylated product, optionally after an intervening cleaning step, is then impregnated with a thermosetting resin. Examples of such thermosetting resins include the phenolformaldehyde and urea-formaldehyde resins, urethane resins and the like. In the case of phenolic resins these are suitably resoles which are usually liquids but can be used in solid powder form, of, as a solution or dispersion thereof in a solvent. Examples of resins which can be used in the process of the present invention are sold under various trade names including the following:

BD 937 (ex Reichold, Canada is a phenol-aldehyde resin)
BD 804 (ex Reichold, Canada is a phenol-aldehyde resin)
BK 140 (ex Bakelite UK, is a phenol-aldehyde resin)
CELLOBOND ® J2005A (ex BP Chemicals Ltd, an aqueous solution of a phenolic resole resin, solids content=65% w/w)
CELLOBOND ® J2015A (ex BP Chemicals Ltd, a liquid phenol-formaldehyde resole resin, solids content=50% w/w)
CELLOBOND ® J1047H (ex BP Chemicals Ltd, a phenol-formaldehyde Novolac resin ground with hexamine).

DDP 5064 (ex Dynochem, UK is a phenol-aldehyde resin).
R8821/1 (ex BP Chemicals Ltd, a solid phenol-formaldehyde resin).

These resins are the Novolac or resole type resins which are spray dried and, in some cases, are water soluble.

The impregnation with a thermosetting resin is suitably carried out by intimately mixing the LM (which may have been previously phthalylated in a sequential process as described above) with a resin in a finely divided powder form or in the form of a solution or a dispersion in a solvent. In the case of some resins, if used in powder form, it is preferable to initially dampen the phthalylated product with water, e.g. about 5-15% w/w, preferably 10% w/w, by thorough mixing. The dampened wood can then be mixed with the powdered resin and then transferred to a press to give the final board. One such resin CELLOBOND® J1047H (ex BP Chemicals Ltd, a phenol-aldehyde resin) which is used on a dampened phthalylated product.

The phthalylated, resin-impregnated product is heat cured suitably in such a manner that the core temperature of the treated LM is suitably >100° C., preferably from 110°-120° C. This can be achieved by heating the phthalylated, resin-impregnated product suitably to a surface temperature of 150°-250° C., preferably from 170°-220° C.

Where the LM treated is wood in fibrous, particulate or shredded form, the resin-impregnated LM can be pressed in a die with a pre-heated punch to e.g. 5.5 mm stops at an elevated temperature of e.g. 180° C. for a short duration e.g. 10 minutes. The resultant product can be in the shape of a board, flat sheet or a moulded product depending on the shape of the die and the pressure applied. Boards etc. produced from such LMs can be conditioned at a desired relative humidity (hereafter "RH") e.g. 65% and at a temperature of about 20° C. before testing for its physical characteristics.

Where the treatment of the LM is carried out either simultaneously, or, in a reverse sequence to that described above, i.e. initially with a thermosetting resin and then with phthalic anhydride, the cooking of the phthalylated LM at elevated temperature can be omitted and the phthalylated, resin-impregnated LM can be subjected directly to heat curing as described above.

The boards thus produced from particles of LM were tested under static bending conditions and after soaking in water for 24 hours. The boards were also tested for internal bond strength and swelling after soaking in cold and hot water respectively.

The above tests showed that the boards thus produced had high dimensional stability and excellent resistance to water and to swelling when exposed to water. Moreover, the phthalic anhydride applied to the LM did not leach out from the LM upon soaking or exposure to water to any significant extent.

The present invention is further illustrated with reference to the following Examples.

EXAMPLES

The LM to be modified comprised a mixture of shreds from hardwoods and softwoods (50/50 w/w, particle size 2 mm×0.15 mm). The LM was first oven-dried then mixed with various amounts of powdered phthalic anhydride as shown in the Table below. The mixture was cooked in a closed, but not sealed, container at 160° C. for 1 hour. The product was not cleaned prior to use. The modified LM product corresponded to the weight gain equivalent of the amount of the chemicals used.

The crude PA modified LM was dampened with 10% w/w water, stirred in with a food mixer, and then 10% w/w of powdered resin added thereto and mixed in. In the case where a liquid resin such as CELLOBOND® J2005A was used, it was diluted to 50% w/w solids and added to the PA modified LM. The resinated mixture was then pressed in a die with a pre-heated punch to 5.5 mm stops at 180° C. for 10 minutes to form the boards. The boards so formed were conditioned no 65% relative humidity at 20° C. before testing.

The conditioned boards as such and after soaking in water at 20° C. for 24 hours, were tested under static bending using the method of BS1142/90 as a guide. A sample of this board was tested for internal bond strength and another sample of the board was measured for swelling after a) a soaking in water at 20° C. for 24 hours;
b) after 2 hour boil and 1 hour cold soak; and
c) after drying at 70° C. followed by reconditioning at 20° C. and 65% relative humidity to constant weight.

These samples were then tested for internal bond strength using the method of BS5669.

The procedure used for making the boards and the results are tabulated below:

TABLE 1

| Formulation used in | Ingredients | Adhesive |
|---|---|---|
| CT 1 | Unmodified shred | +10% BD 937 |
| Example 1 | 5% phthalylated shred | +10% BD 937 |
| Example 2 | 17.5% phthalylated shred | +10% BD 937 |
| Example 3 | 25% phthalylated shred | +10 BD 937 |
| CT 2 | unmodified shred | +10% J2005A solids |
| Example 4 | 10% phthalylated shred | +10% J2005A solids |
| Example 5 | 17.5% phthalylated shred | +10% J2005A solids |
| Example 6 | 25% phthalylated shred | +10% J2005A solids |
| CT 3 | unmodified shred | +10% DDP 5064 |
| Example 7 | 17.5% phthalylated | +10% DDP 5064 |
| Example 8 | 25% phthalylated shred | +10% DDP 5064 |
| *CT 4 | unmodified shred | +10% BD 804 |
| Example 9 | 10% phthalylated shred | +10% BD 804 |
| Example 10 | 25% phthalylated shred | +10% BD 804 |
| CT 5 | unmodified shred | +10% R8821/1 |
| Example 11 | 17.5% phthalylated shred | +10% R8821/1 |

CT - Comparative Test not according to the invention.

TABLE 2

| | | Results of static bending tests, given as conventional moduli. | | | | | | | | |
|---|---|---|---|---|---|---|---|---|---|---|
| | | Dry Static Bending | | | Wet Static Bending | | | Retained properties | | |
| Name | Density Kg/m$^3$ | MOR MPa | MOE MPa | WTF/Vol kPa | MOR MPa | MOE MPa | WTF/Vol kPa | MOR % | MOE % | WTF/Vol % |
| CT 1 | 1021 | 25.0 | 2846 | 15.6 | 8.9 | 861 | 7.8 | 36 | 30 | 50 |
| Example 1 | 924 | 26.1 | 2896 | 19.5 | 21.6 | 1891 | 22.4 | 83 | 65 | 115 |
| Example 2 | 949 | 29.1 | 3783 | 14.6 | 21.1 | 1991 | 20.8 | 73 | 53 | 142 |
| Example 3 | 869 | 28.6 | 3764 | 12.2 | 29.9 | 2009 | 30.3 | 105 | 53 | 248 |

TABLE 2-continued

| | | Results of static bending tests, given as conventional moduli. | | | | | | | |
|---|---|---|---|---|---|---|---|---|---|
| | | Dry Static Bending | | | Wet Static Bending | | | Retained properties | | |
| Name | Density Kg/m³ | MOR MPa | MOE MPa | WTF/Vol kPa | MOR MPa | MOE MPa | WTF/Vol kPa | MOR % | MOE % | WTF/Vol % |
| CT 2 | 978 | 39.8 | 4441 | 21.8 | 35.3 | 2140 | 44.9 | 89 | 48 | 206 |
| Example 4 | 961 | 44.4 | 4559 | 26.3 | 26.5 | 2527 | 22.0 | 60 | 55 | 84 |
| Example 5 | 957 | 35.2 | 4485 | 17.0 | 22.8 | 2542 | 17.7 | 65 | 57 | 104 |
| Example 6 | 900 | 37 | 3616 | 24.3 | 29.1 | 2005 | 34.4 | 79 | 55 | 142 |
| CT 3 | 999 | 28 | 2979 | 17.4 | 8.1 | 752 | 7.1 | 29 | 25 | 41 |
| Example 7 | 975 | 32.5 | 4187 | 16.0 | 16.2 | 1597 | 14.0 | 50 | 38 | 88 |
| Example 8 | 978 | 27.2 | 3665 | 12 | 14.1 | 1116 | 15.4 | 52 | 30 | 128 |
| CT 4 | 970 | 17.3 | 2251 | 9.2 | 4.4 | 435 | 3.4 | 25 | 19 | 37 |
| Example 9 | 952 | 23.2 | 3752 | 10.3 | 11.7 | 1181 | 10.3 | 51 | 31 | 100 |
| Example 10 | 915 | 29.7 | 3178 | 18.3 | 16.1 | 1359 | 16.4 | 54 | 43 | 90 |
| CT 9 | 1003 | 36.8 | 4383 | 24.8 | 10.7 | 1228 | 10.9 | 29 | 28 | 44 |
| Example 11 | 926 | 25.6 | 3637 | 12.0 | 14.6 | 1651 | 11.5 | 57 | 45 | 95 |

MOE - Modulus of Elasticity
WTF - Work to Failure
MOR - Modulus of Rupture
CT - Comparative Tests not according to the invention

TABLE 3

| | | Internal Bond Strength (IBS) and Swelling Data | | | | | | | | | |
|---|---|---|---|---|---|---|---|---|---|---|---|
| | | Original | Boiled | | Cold Soak | | 2 hour boil | | Reconditioned | | Linear |
| Name | Density Kg/m³ | IBS kPa | IBS kPa | Retained % | weight gain % | swell % | weight gain % | swell % | Weight gain % | swell % | swell % |
| CT 1 | 1021 | 2107 | 276 | 13 | 30 | 14 | 64 | 33 | 0 | 17 | |
| Example 1 | 1054 | 3894 | 2507 | 64 | 21 | 9 | 46 | 24 | 1.7 | 13 | 0 |
| Example 2 | 997 | 4300 | 2445 | 57 | 25 | 9 | 44 | 21 | −0.4 | 8 | −0.2 |
| Example 3 | 869 | 4617 | 2712 | 59 | 20 | 5 | 53 | 11 | 4 | 1 | |
| CT 2 | 978 | 6029 | 700 | 12 | 21 | 8 | 65 | 37 | 1 | 21 | |
| Example 4 | 969 | 3811 | 4503 | 118 | 11 | 4 | 38 | 17 | 2 | 7 | −0.3 |
| Example 5 | 937 | 3389 | 4292 | 127 | 12 | 3 | 41 | 13 | 0.7 | 4 | −0.1 |
| Example 6 | 900 | 4674 | 3685 | 79 | 15 | 4 | 47 | 11 | 4 | 3 | |
| CT 3 | 999 | 1634 | 212 | 13 | 32 | 13 | 75 | 41 | 0 | 29 | |
| Example 7 | 964 | 1990 | 2905 | 146 | 16 | 6 | 39 | 17 | 0.4 | 7 | −0.3 |
| Example 8 | 978 | 2910 | 2000 | 69 | 15 | 3 | 39 | 10 | 1 | 0 | |
| CT 4 | 970 | 1041 | 291 | 28 | 42 | 22 | 104 | 68 | 2 | 40 | |
| Example 9 | 1007 | 2817 | 707 | 25 | 31 | 15 | 55 | 29 | −0.1 | 17 | 0.1 |
| Example 10 | 915 | 2935 | 1711 | 58 | 28 | 6 | 50 | 13 | 3 | 3 | |
| CT 5 | 1052 | 3390 | 542 | 16 | 22 | 10 | 59 | 38 | 2.4 | 21 | 0.2 |
| Example 11 | 932 | 3438 | 1520 | 44 | 25 | 8 | 49 | 25 | 0 | 11 | 0.1 |

EXAMPLES

These Examples were carried out to test the performance of boards prepared from shreds treated by the single-step simultaneous treatment thereof with a mixture of phthalic anhydride and the resin.

As in the above Examples a further wood substrate was prepared by mixing shreds (2 mm×0.15 mm) of hardwoods and softwoods (50/50). The resin used was CELLOBOND® J2015A, a phenolic resin ex BP Chemicals Ltd.

In this case, a known weight of phthalic anhydride was mixed into a stirred solution of the resin to give a homogeneous solution/dispersion and this is referred to as a 'modified resin'.

The quantities of phthalic anhydride used to produce this preliminary modified resin were 5%, 10% and 17.5% w/w based on the dry wood. This phthalic anhydride was mixed into a sample of the resin equivalent to 10% w/w of the dry wood. The ratio of phthalic anhydride to resin in this modified resin was therefore:

| phthalic anhydride (w/w) | J2015A Resin (w/w) |
|---|---|
| 50 | 100 |
| 100 | 100 |
| 175 | 100 |

The wood to be used was oven dried and thereafter the modified resin was added thereto. The resinated mixture was then pressed in a die with a pre-heated punch at 5.5 mm stops at 180° C. for 10 minutes to produce completed boards. These completed boards were then conditioned to 65% relative humidity at 20° C. before testing.

The boards were tested under static bending, both conditioned and after a 24 hour 20° C. water soak, using the method of BS1142/90 as a guide. A sample was tested for internal bond strength using the method of BS5669. Another sample was measured for swell after (i) the water soak treatment; (ii) after 2 hour boil and 1 hour cold soak; and after drying at 70° C. followed by reconditioning as described in the Examples above. This sample was then tested for internal bond strength also.

TABLE 4

The procedure of simultaneous addition of phthalic anhydride and the resin and results. The results achieved are tabulated below:

| Formulation used in | Procedure | Adhesive % |
|---|---|---|
| CT 6 | Normal shred with 10% J 2015A resin, 10 min 180° C. | 0 + 10 |
| Example 12 | Normal shred with 5% phthalic anhydride and 10% J2015A resin, 10 min 180° C. | 5 + 10 |
| Example 13 | Normal shred with 10% phthalic anhydride and 10% J2015A resin, | 10 + 10 |

TABLE 4-continued

The procedure of simultaneous addition of phthalic anhydride and the resin and results. The results achieved are tabulated below:

| Formulation used in | Procedure | Adhesive % |
|---|---|---|
| Example 14 | 10 min 180° C. Normal shred with 17.5% phtalic anhydride and 10% J2015A resin, 10 min 180° C. | 17.5 + 10 |

TABLE 5

Results of static bending tests on boards made by simultaneous addition, given as conventional moduli.

| | | Dry Static Bending | | | Wet Static Bending | | | Retained properties | | |
|---|---|---|---|---|---|---|---|---|---|---|
| Name | Density Kg/m³ | MOR MPa | MOE MPa | WTF/Vol kPa | MOR MPa | MOE MPa | WTF/Vol kPa | MOR % | MOE % | WTF/Vol % |
| CT 6 | 944 | 26.9 | 3338 | 15.1 | 9.1 | 878 | 7.7 | 34 | 26 | 51 |
| Example 12 | 1006 | 44.9 | 4745 | 25.6 | 25.7 | 1822 | 33.1 | 57 | 38 | 130 |
| Example 13 | 951 | 36.7 | 3771 | 23.2 | 24.5 | 2084 | 26.8 | 67 | 55 | 116 |
| Example 14 | 945 | 33.9 | 4091 | 17.4 | 25.3 | 1824 | 37.7 | 75 | 45 | 216 |

MOE - Modulus of Elasticity
WTF - Work to Failure
MOR - Modulus of Rupture
CT - Comparative Tests not according to the invention

TABLE 6

Internal Bond Strength and Swelling Data

| | | Original | Boiled | | Cold Soak | | 2 hour boil | | Reconditioned | | Linear |
|---|---|---|---|---|---|---|---|---|---|---|---|
| Name | Density Kg/m³ | IBS kPa | IBS kPa | Retained % | weight gain % | swell % | weight gain % | swell % | weight gain % | swell % | swell % |
| CT 6 | 921 | 1873 | 624 | 33 | 17 | 9 | 64 | 46 | 2 | 27 | 0.2 |
| Example 12 | 1017 | 5406 | 2086 | 39 | 13 | 7 | 49 | 28 | 1 | 14 | 0.1 |
| Example 13 | 1005 | 6076 | 1897 | 31 | 15 | 11 | 53 | 30 | 0 | 14 | 0.1 |
| Example 14 | 990 | 6458 | 1610 | 25 | 13 | 7 | 49 | 23 | −1 | 11 | −0.3 |

The above results show that using the single step process, even by using the phthalic anhydride and resin at the lowest level, boards were obtained which were stronger, stiffer and tougher and these boards also had a higher internal bond strength than the unmodified control boards or boards modified with phthalic anhydride alone.

The above Examples and comparative tests were carried out using boards which were somewhat smaller in their dimensions than is recommended by the British Standard tests (BS 5669). In order to test the improvement in performance further, the following additional Examples and tests were carried out with boards which were increased in scale so as to meet fully the specification of BS 5669 tests. Two methods were used in the following Examples and tests.

In the first method, referred to here as the modification method, the wood shred was made by mixing oven-dry softwood shred with a measured quantity of finely ground PA and heated in an oven at 160° C. for a period of 1 hr. This shred was stirred with CELLOBOND ® J2005A liquid phenolic resin (5% wt/wt solids as a 50% solution) for 1 minute. A mattress was then formed and pressed at 170° C. for 12 minutes, including closing time to form the board. A slow pressure release was then used.

In the second method, referred to here as the addition method (and in which the sequence of addition of PA and thermosetting resin was reversed), unmodified wood shred was stirred with J2005A liquid phenolic resin (5% wt/wt solids, as a 50% solution) for 30 seconds. The required quantity of finely ground PA was then added and stirred in for a further 30 seconds. The board was then made by pressing at 170° C. as described in the first method above.

Four boards of each type were produced.

The physical testing of the boards was carried out as follows:

The boards were allowed to stabilise for 5 minutes after pressing, to allow for any variation or changes in dimensions that may occur during the initial stages immediately after formation. The thickness of each board was then measured at four marked positions about 5 cm in from the centre of each edge. A line was drawn on the board and two marks about 25 cm apart were made across the line. The distance between the marks was measured with a ruler.

The boards were then conditioned at 65% relative humidity (r.h.) and 20° C. The thickness at the marked positions and the distance between the two marks were then measured again. The boards were marked out and cut into samples as shown in the sketch (not to scale) below:

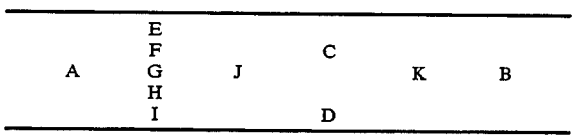

Sample A—used for static bending testing at 65% r.h.
Sample B—used for static bending testing after soaking in water at 20° C. for 24 hrs.
Sample C—used to measure thickness and linear swell and water uptake on soaking in water for 1 hr and 42 hrs.
Sample D—used to measure thickness and linear swell and water uptake on conditioning to 93% r.h. and 20° C., and after boiling in water for 2 hrs (DIN 100).
Samples E,F,H and I—one each of each type of board for IBS testing after:
 —conditioning at 93% r.h. and 20° C.
 —1 hour water soak at 20° C.
 —24 hour water soak at 20° C.
 —2 hour boil (DIN 100).
Sample J—used for V313 cyclical testing.
Sample K—used for non-standard cyclical testing.

The non-standard cyclical testing procedure used was as follows: The samples were weighed and measured for thickness, width and length. They were then oven-dried at 105° C. and weighed and measured for thickness. The samples were then boiled in water for 2 hours, followed by drying at 105° C. for about 20 hrs. This was followed by weighing and thickness measurement. The boiling, drying and measurement cycles were repeated for five cycles. The samples were then conditioned at 65% r.h. and 20° C. before being weighed and measured for thickness, width and length. Finally, the IBS of the samples was measured.

The following calculations were applied to the results obtained:

A. Static Bending Tests

Two sets of calculations were carried out on the results of the stating bending tests. The conventional modulus of rupture (MOR), modulus of elasticity (MOE) were calculated according to BS 5669. The work to failure per unit volume (WTF/vol) was also calculated.

B. Internal Bond Strength (IBS)

In measuring the strength of the wood/matrix bond, effectively, a short, fat chain is being snapped. The chain will break at its weakest link. For quality control work, the existence of such weak links is of great commercial significance.

C. Other Results

Swelling, linear expansion and water uptake have been calculated as in BS 5669.

The results from all the above additional Examples and tests are tabulated below:

TABLE 8

Internal bond strength - 93% relative humidity

| Board from Ex Ref No. | Type | 65% r.h. density Kg/m³ | 65% r.h. IBS kPa | 93% r.h. density Kg/m³ | 93% r.h. IBS kPa | retention % |
|---|---|---|---|---|---|---|
| FZ 3 | control | 1008 | 1564 | 966 | 1100 | |
| FZ 4 | control | 1005 | 1722 | 1019 | 1318 | |
| FZ 5 | control | 1053 | 2353 | 1036 | 1655 | |
| FZ 6 | control | 990 | 1855 | 970 | 915 | |
| weighted mean | | 1014 | 1977 | 998 | 1358 | 69 |
| FZ 12 | 10% mod. | 1005 | 3677 | 965 | 2670 | |
| FZ 13 | 10% mod. | 995 | 3573 | 990 | 3147 | |
| FZ 14 | 10% mod. | 980 | 3733 | 931 | 2705 | |
| FZ 15 | 10% mod. | 978 | 3620 | 958 | 2916 | |
| weighted mean | | 990 | 3677 | 961 | 2923 | 79 |
| FY 87 | 14% mod. | 984 | 3143 | 1010 | 2870 | |
| FY 88 | 14% mod. | 996 | 3358 | 961 | 3170 | |
| FY 89 | 14% mod. | 1001 | 3431 | 977 | 3007 | |
| FY 90 | 14% mod. | 1044 | 3980 | 1022 | 2610 | |
| weighted mean | | 1006 | 3590 | 992 | 3015 | 84 |
| FY 93 | 18% mod. | 1008 | 3973 | 926 | 2800 | |
| FY 94 | 18% mod. | 1030 | 4050 | 1034 | 3649 | |
| FY 95 | 18% mod. | 1025 | 3955 | 1032 | 3356 | |
| FY 96 | 18% mod. | 1042 | 3903 | 991 | 3632 | |
| weighted mean | | 1026 | 3993 | 996 | 3546 | 89 |
| FZ 23 | 10% add. | 961 | 2872 | 997 | 2170 | |
| FZ 24 | 10% add. | 980 | 3338 | 966 | 2040 | |
| FZ 25 | 10% add. | 993 | 3056 | 999 | 2146 | |
| FZ 26 | 10% add. | 986 | 3070 | 988 | 2111 | |
| weighted mean | | 980 | 3155 | 988 | 2143 | 68 |
| FZ 33 | 14% add. | 956 | 3337 | 987 | 2100 | |
| FZ 34 | 14% add. | 983 | 3821 | 951 | 0 | |
| FZ 35 | 14% add. | 987 | 3596 | 955 | 2161 | |

TABLE 7

Results of static bending tests at relative humidity 65%

| Ex. Ref No. | Type | Conditioned MOR MPa | Conditioned MOE MPa | Conditioned WTF/Vol kPa | 24 hour soak MOR MPa | 24 hour soak MOE MPa | 24 hour soak WFT/Vol kPa | Retention MOR % | Retention MOE % | Retention WTF/V % |
|---|---|---|---|---|---|---|---|---|---|---|
| FZ 3 | control | 24.2 | 4086 | 13.1 | 9.5 | 1033 | 9.0 | 39 | 25 | 69 |
| FZ 4 | control | 23.6 | 3919 | 12.5 | 7.2 | 877 | 5.5 | 30 | 22 | 44 |
| FZ 5 | control | 20.8 | 4047 | 8.1 | 7.1 | 831 | 6.9 | 34 | 21 | 85 |
| FZ 6 | control | 19.9 | 3799 | 9.1 | 5.5 | 562 | 4.5 | 28 | 15 | 49 |
| mean | | 22.1 | 3963 | 10.7 | 7.3 | 826 | 6.5 | 33 | 21 | 62 |
| FZ 12 | 10% mod. | 26.7 | 4173 | 12.6 | 14.8 | 1545 | 15.3 | 56 | 37 | 121 |
| FZ 13 | 10% mod. | 28.1 | 4077 | 13.2 | 19.5 | 1750 | 17.7 | 69 | 43 | 134 |
| FZ 14 | 10% mod. | 31.4 | 4620 | 14.0 | 17.9 | 1880 | 12.0 | 57 | 41 | 86 |
| FZ 15 | 10% mod. | 31.4 | 4554 | 14.3 | 20.2 | 2138 | 17.4 | 64 | 47 | 122 |
| mean | | 29.4 | 4356 | 13.5 | 18.1 | 1828 | 15.6 | 62 | 42 | 116 |
| FY 87 | 14% mod. | 35.4 | 5060 | 16.4 | 20.9 | 2477 | 15.2 | 59 | 49 | 93 |
| FY 88 | 14% mod. | 31.1 | 4966 | 12.5 | 28.7 | 3384 | 15.9 | 92 | 68 | 127 |
| FY 89 | 14% mod. | 26.2 | 4826 | 9.5 | 21.4 | 2147 | 16.9 | 82 | 44 | 178 |
| FY 90 | 14% mod. | 31.5 | 5046 | 13.1 | 22.9 | 2722 | 13.9 | 73 | 54 | 106 |
| mean | | 31.1 | 4974 | 12.9 | 23.5 | 2682 | 15.5 | 76 | 54 | 126 |
| FY 93 | 18% mod. | 36.9 | 6329 | 13.1 | 24.1 | 2994 | 13.5 | 65 | 47 | 103 |
| FY 94 | 18% mod. | 29.6 | 5496 | 9.9 | 23.9 | 2771 | 14.5 | 81 | 50 | 146 |
| FY 95 | 18% mod. | 31.3 | 5157 | 11.6 | 28.7 | 3376 | 17.0 | 92 | 65 | 146 |
| FY 96 | 18% mod. | 33.0 | 5756 | 12.1 | 22.8 | 2584 | 14.9 | 69 | 45 | 123 |
| mean | | 32.7 | 5685 | 11.7 | 24.9 | 2931 | 14.9 | 77 | 52 | 129 |
| FZ 23 | 10% add. | 28.9 | 5189 | 10.5 | 26.4 | 3594 | 13.2 | 91 | 69 | 125 |
| FZ 24 | 10% add. | 34.5 | 5440 | 14.1 | 26.3 | 3071 | 16.9 | 76 | 56 | 120 |
| FZ 25 | 10% add. | 34.0 | 5713 | 13.3 | 27.1 | 3466 | 14.5 | 80 | 61 | 109 |
| FZ 26 | 10% add. | 30.4 | 4924 | 12.1 | 30.1 | 3119 | 19.5 | 99 | 63 | 162 |
| mean | | 31.9 | 5317 | 12.5 | 27.5 | 3312 | 16.0 | 87 | 62 | 129 |
| FZ 33 | 14% add. | 30.9 | 5786 | 10.2 | 26.1 | 2541 | 15.5 | 85 | 44 | 151 |
| FZ 34 | 14% add. | 32.2 | 5776 | 11.5 | 28.1 | 3617 | 14.0 | 87 | 63 | 122 |
| FZ 35 | 14% add. | 32.4 | 5909 | 11.2 | 29.2 | 3756 | 15.6 | 90 | 64 | 139 |
| FZ 36 | 14% add. | 27.7 | 4922 | 9.9 | 25.5 | 3551 | 13.0 | 92 | 72 | 131 |
| mean | | 30.8 | 5598 | 10.7 | 27.2 | 3366 | 14.5 | 89 | 61 | 136 |
| FZ 43 | 18% add. | 29.0 | 5696 | 9.1 | 29.0 | 4349 | 12.1 | 100 | 76 | 134 |
| FZ 44 | 18% add. | 32.3 | 5994 | 11.1 | 26.3 | 3541 | 13.4 | 81 | 59 | 121 |
| FZ 45 | 18% add. | 33.1 | 5833 | 11.7 | 31.1 | 4186 | 14.9 | 94 | 72 | 127 |
| FZ 46 | 18% add. | 30.2 | 4976 | 11.4 | 33.3 | 4420 | 16.0 | 110 | 89 | 141 |
| mean | | 31.2 | 5624 | 10.8 | 29.9 | 4124 | 14.1 | 96 | 74 | 131 |

TABLE 8-continued

Internal bond strength - 93% relative humidity

| Board from Ex Ref No. | Type | 65% r.h. density Kg/m³ | IBS kPa | 93% r.h. density Kg/m³ | IBS kPa | retention % |
|---|---|---|---|---|---|---|
| FZ 36 | 14% add. | 873 | 2664 | 882 | 1920 | |
| weighted mean | | 950 | 3584 | 944 | 2060 | 57 |
| FZ 43 | 18% add. | 947 | 3463 | 979 | 2787 | |
| FZ 44 | 18% add. | 962 | 3460 | 976 | 2730 | |
| FZ 45 | 18% add. | 994 | 4109 | 941 | 2496 | |
| FZ 46 | 18% add. | 915 | 3298 | 943 | 0 | |
| weighted mean | | 955 | 3677 | 960 | 2671 | 73 |

TABLE 9

Internal bond strength - 1 hour cold soak

| Board from Ex Ref No. | Type | 65% r.h. density Kg/m³ | IBS kPa | 1 hour cold soak density Kg/m³ | IBS kPa | retention % |
|---|---|---|---|---|---|---|
| FZ 3 | control | 1008 | 1564 | 1016 | 1888 | |
| FZ 4 | control | 1005 | 1722 | 977 | 1270 | |
| FZ 5 | control | 1053 | 2353 | 973 | 1417 | |
| FZ 6 | control | 990 | 1855 | 962 | 648 | |
| weighted mean | | 1014 | 1977 | 982 | 1525 | 77 |
| FZ 12 | 10% mod. | 1005 | 3677 | 999 | 3296 | |
| FZ 13 | 10% mod. | 995 | 3573 | 973 | 3561 | |
| FZ 14 | 10% mod. | 980 | 3733 | 921 | 3014 | |
| FZ 15 | 10% mod. | 978 | 3620 | 972 | 3422 | |
| weighted mean | | 990 | 3677 | 966 | 3426 | 93 |
| FY 87 | 14% mod. | 984 | 3143 | 995 | 3774 | |
| FY 88 | 14% mod. | 996 | 3358 | 1006 | 3863 | |
| FY 89 | 14% mod. | 1001 | 3431 | 983 | 3594 | |
| FY 90 | 14% mod. | 1044 | 3980 | 1007 | 4004 | |
| weighted mean | | 1006 | 3590 | 998 | 3880 | 108 |
| FY 93 | 18% mod. | 1008 | 3973 | 956 | 3407 | |
| FY 94 | 18% mod. | 1030 | 4050 | 1015 | 3742 | |
| FY 95 | 18% mod. | 1025 | 3955 | 987 | 4061 | |
| FY 96 | 18% mod. | 1042 | 3903 | 1012 | 4014 | |
| weighted mean | | 1026 | 3993 | 992 | 3939 | 99 |
| FZ 23 | 10% add. | 961 | 2872 | 1009 | 3340 | |
| FZ 24 | 10% add. | 980 | 3338 | 1046 | 3670 | |
| FZ 25 | 10% add. | 993 | 3056 | 982 | 3035 | |
| FZ 26 | 10% add. | 986 | 3070 | 1000 | 3311 | |
| weighted mean | | 980 | 3155 | 1009 | 3440 | 109 |
| FZ 33 | 14% add. | 956 | 3337 | 995 | 3387 | |
| FZ 34 | 14% add. | 983 | 3821 | 1051 | 4021 | |
| FZ 35 | 14% add. | 987 | 3596 | 967 | 3171 | |
| FZ 36 | 14% add. | 873 | 2664 | 1013 | 4021 | |
| weighted mean | | 950 | 3584 | 1006 | 3810 | 106 |
| FZ 43 | 18% add. | 947 | 3463 | 985 | 3893 | |
| FZ 44 | 18% add. | 962 | 3460 | 952 | 3522 | |
| FZ 45 | 18% add. | 994 | 4109 | 948 | 3465 | |
| FZ 46 | 18% add. | 915 | 3298 | 932 | 3237 | |
| weighted mean | | 955 | 3677 | 954 | 3627 | 99 |

TABLE 10

Internal bond strength - 24 hour cold soak

| Board from Ex Ref No. | Type | 65% r.h. density Kg/m³ | IBS kPa | 24 hour cold soak density Kg/m³ | IBS kPa | retention % |
|---|---|---|---|---|---|---|
| FZ 3 | control | 1008 | 1564 | 948 | 776 | |
| FZ 4 | control | 1005 | 1722 | 946 | 236 | |
| FZ 5 | control | 1053 | 2353 | 1035 | 520 | |
| FZ 6 | control | 990 | 1855 | 985 | 503 | |
| weighted mean | | 1014 | 1977 | 979 | 600 | 30 |
| FZ 12 | 10% mod. | 1005 | 3677 | 979 | 3072 | |
| FZ 13 | 10% mod. | 995 | 3573 | 935 | 2969 | |
| FZ 14 | 10% mod. | 980 | 3733 | 973 | 3020 | |
| FZ 15 | 10% mod. | 978 | 3620 | 965 | 3107 | |
| weighted mean | | 990 | 3677 | 963 | 3067 | 83 |
| FY 87 | 14% mod. | 984 | 3143 | 966 | 3329 | |
| FY 88 | 14% mod. | 996 | 3358 | 1020 | 3786 | |
| FY 89 | 14% mod. | 1001 | 3431 | 926 | 2928 | |
| FY 90 | 14% mod. | 1044 | 3980 | 1018 | 3573 | |
| weighted mean | | 1006 | 3590 | 982 | 3563 | 99 |
| FY 93 | 18% mod. | 1008 | 3973 | 1010 | 3615 | |
| FY 94 | 18% mod. | 1030 | 4050 | 978 | 3320 | |
| FY 95 | 18% mod. | 1025 | 3955 | 996 | 3515 | |
| FY 96 | 18% mod. | 1042 | 3903 | 1043 | 4091 | |
| weighted mean | | 1026 | 3993 | 1007 | 3740 | 94 |
| FZ 23 | 10% add. | 961 | 2872 | 921 | 2067 | |
| FZ 24 | 10% add. | 980 | 3338 | 1019 | 2877 | |
| FZ 25 | 10% add. | 993 | 3056 | 989 | 2246 | |
| FZ 26 | 10% add. | 986 | 3070 | 1016 | 2677 | |
| weighted mean | | 980 | 3155 | 986 | 2600 | 82 |
| FZ 33 | 14% add. | 956 | 3337 | 962 | 2769 | |
| FZ 34 | 14% add. | 983 | 3821 | 993 | 3484 | |
| FZ 35 | 14% add. | 987 | 3596 | 1001 | 2830 | |
| FZ 36 | 14% add. | 873 | 2664 | 956 | 2787 | |
| weighted mean | | 950 | 3584 | 978 | 3034 | 85 |
| FZ 43 | 18% add. | 947 | 3463 | 959 | 2806 | |
| FZ 44 | 18% add. | 962 | 3460 | 902 | 2837 | |
| FZ 45 | 18% add. | 994 | 4109 | 968 | 2723 | |
| FZ 46 | 18% add. | 915 | 3298 | 924 | 2857 | |
| weighted mean | | 955 | 3677 | 938 | 2833 | 77 |

TABLE 11

Internal bond strength - DIN 100

| Board from Ex Ref No. | Type | 65% r.h. density Kg/m³ | IBS kPa | DIN 100 density Kg/m³ | IBS kPa | retention % |
|---|---|---|---|---|---|---|
| FZ 3 | control | 1008 | 1564 | 953 | 103 | |
| FZ 4 | control | 1005 | 1722 | 2349 | 75 | |
| FZ 5 | control | 1053 | 2353 | 1065 | 477 | |
| FZ 6 | control | 990 | 1855 | 974 | 157 | |
| weighted mean | | 1014 | 1977 | 1335 | 245 | 12 |
| FZ 12 | 10% mod. | 1005 | 3677 | 921 | 1980 | |
| FZ 13 | 10% mod. | 995 | 3573 | 974 | 2652 | |
| FZ 14 | 10% mod. | 980 | 3733 | 981 | 2559 | |
| FZ 15 | 10% mod. | 978 | 3620 | 983 | 2332 | |
| weighted mean | | 990 | 3677 | 965 | 2514 | 68 |
| FY 87 | 14% mod. | 984 | 3143 | 950 | 2725 | |
| FY 88 | 14% mod. | 996 | 3358 | 948 | 2510 | |
| FY 89 | 14% mod. | 1001 | 3431 | 986 | 2804 | |
| FY 90 | 14% mod. | 1044 | 3980 | 1023 | 3179 | |
| weighted mean | | 1006 | 3590 | 977 | 2903 | 81 |
| FY 93 | 18% mod. | 1008 | 3973 | 973 | 25,!5 | |
| FY 94 | 18% mod. | 1030 | 4050 | 968 | 2582 | |
| FY 95 | 18% mod. | 1025 | 3955 | 1018 | 3088 | |
| FY 96 | 18% mod. | 1042 | 3903 | 1002 | 2845 | |
| weighted mean | | 1026 | 3993 | 990 | 2839 | 71 |
| FZ 23 | 10% add. | 961 | 2872 | 880 | 1112 | |
| FZ 24 | 10% add. | 980 | 3338 | 955 | 1253 | |
| FZ 25 | 10% add. | 993 | 3056 | 1007 | 1577 | |
| FZ 26 | 10% add. | 986 | 3070 | 969 | 1373 | |
| weighted mean | | 980 | 3155 | 953 | 1401 | 44 |
| FZ 33 | 14% add. | 956 | 3337 | 980 | 1029 | |

TABLE 11-continued

Internal bond strength - DIN 100

| Board from Ex Ref No. | Type | 65% r.h. density Kg/m³ | IBS kPa | DIN 100 density Kg/m³ | IBS kPa | retention % |
|---|---|---|---|---|---|---|
| FZ 34 | 14% add. | 983 | 3821 | 947 | 973 | |
| FZ 35 | 14% add. | 987 | 3596 | 1015 | 1349 | |
| FZ 36 | 14% add. | 873 | 2664 | 807 | 1240 | |
| weighted | | 950 | 3584 | 937 | 1206 | 34 |
| FZ 43 | 18% add. | 947 | 3463 | 968 | 1055 | |
| FZ 44 | 18% add. | 962 | 3460 | 974 | 925 | |
| FZ 45 | 18% add. | 994 | 4109 | 996 | 1076 | |
| FZ 46 | 18% add. | 915 | 3298 | 955 | 838 | |
| Weighted mean | | 955 | 3677 | 973 | 1019 | 28 |

TABLE 12

Internal bond strength - V313 cyclic testing

| Board from Ex Ref No. | Type | 65% r.h. density Kg/m³ | IBS kPa | final density Kg/m³ | IBS kPa | retention % |
|---|---|---|---|---|---|---|
| FZ 3 | control | 1008 | 1564 | 986 | 477 | |
| FZ 4 | control | 1005 | 1722 | 1022 | 451 | |
| FZ 5 | control | 1053 | 2353 | 1027 | 712 | |
| FZ 6 | control | 990 | 1855 | 985 | 69 | |
| weighted mean | | 1014 | 1977 | 1005 | 546 | 28 |
| FZ 12 | 10% mod. | 1005 | 3677 | 953 | 1927 | |
| FZ 13 | 10% mod. | 995 | 3573 | 990 | 2363 | |
| FZ 14 | 10% mod. | 980 | 3733 | 948 | 2157 | |
| FZ 15 | 10% mod. | 978 | 3620 | 991 | 2268 | |
| weighted mean | | 990 | 3677 | 971 | 2263 | 62 |
| FY 87 | 14% mod. | 984 | 3143 | 940 | 2270 | |
| FY 88 | 14% mod. | 996 | 3358 | 1015 | 2463 | |
| FY 89 | 14% mod. | 1001 | 3431 | 1025 | 2649 | |
| FY 90 | 14% mod. | 1044 | 3980 | 1037 | 2605 | |
| weighted mean | | 1006 | 3590 | 1004 | 2572 | 72 |
| FY 93 | 18% mod. | 1008 | 3973 | 994 | 2711 | |
| FY 94 | 18% mod. | 1030 | 4050 | 1007 | 2531 | |
| FY 95 | 18% mod. | 1025 | 3955 | 1033 | 2356 | |
| FY 96 | 18% mod. | 1042 | 3903 | 1006 | 2764 | |
| weighted mean | | 1026 | 3993 | 1010 | 2668 | 67 |
| FZ 23 | 10% add. | 961 | 2872 | 980 | 1220 | |
| FZ 24 | 10% add. | 980 | 3338 | 989 | 1326 | |
| FZ 25 | 10% add. | 993 | 3056 | 932 | 518 | |
| FZ 26 | 10% add. | 986 | 3070 | 1001 | 1489 | |
| weighted mean | | 980 | 3155 | 976 | 1345 | 43 |
| FZ 33 | 14% add. | 956 | 3337 | 983 | 1167 | |
| FZ 34 | 14% add. | 983 | 3821 | 1008 | 1003 | |
| FZ 35 | 14% add. | 987 | 3596 | 1032 | 1196 | |
| FZ 36 | 14% add. | 873 | 2664 | 896 | 1401 | |
| weighted mean | | 950 | 3584 | 980 | 1255 | 35 |
| FZ 43 | 18% add. | 947 | 3463 | 970 | 1034 | |
| FZ 44 | 18% add. | 962 | 3460 | 989 | 1409 | |
| FZ 45 | 18% add. | 994 | 4109 | 1031 | 1129 | |
| FZ 46 | 18% add. | 915 | 3298 | 966 | 1263 | |
| weighted mean | | 955 | 3677 | 989 | 1267 | 34 |

TABLE 13

Internal bond strength - non-standard cyclic testing

| Board from Ex Ref No. | Type | 65% r.h. density Kg/m³ | IBS kPa | final density Kg/m³ | IBS kPa | retention % |
|---|---|---|---|---|---|---|
| FZ 3 | control | 1008 | 1564 | 975 | 485 | |
| FZ 4 | control | 1005 | 1722 | 1031 | 406 | |
| FZ 5 | control | 1053 | 2353 | 1004 | 413 | |
| FZ 6 | control | 990 | 1855 | 997 | 293 | |
| weighted mean | | 1014 | 1977 | 1001 | 435 | 22 |
| FZ 12 | 10% mod. | 1005 | 3677 | 926 | 1263 | |
| FZ 13 | 10% mod. | 995 | 3573 | 996 | 1556 | |
| FZ 14 | 10% mod. | 980 | 3733 | 953 | 1520 | |
| FZ 15 | 10% mod. | 978 | 3620 | 970 | 1470 | |
| weighted mean | | 990 | 3677 | 961 | 1515 | 41 |
| FY 87 | 14% mod. | 984 | 3143 | 906 | 1259 | |
| FY 88 | 14% mod. | 996 | 3358 | 1015 | 1423 | |
| FY 89 | 14% mod. | 1001 | 3431 | 1029 | 1816 | |
| FY 90 | 14% mod. | 1044 | 3980 | 1002 | 1645 | |
| weighted mean | | 1006 | 3590 | 988 | 1628 | 45 |
| FY 93 | 18% mod. | 1008 | 3973 | 970 | 1380 | |
| FY 94 | 18% mod. | 1030 | 4050 | 980 | 1454 | |
| FY 95 | 18% mod. | 1025 | 3955 | 994 | 1899 | |
| FY 96 | 18% mod. | 1042 | 3903 | 972 | 1662 | |
| weighted mean | | 1026 | 3993 | 979 | 1672 | 42 |
| FZ 23 | 10% add. | 961 | 2872 | 959 | 771 | |
| FZ 24 | 10% add. | 980 | 3338 | 998 | 944 | |
| FZ 25 | 10% add. | 993 | 3056 | 919 | 763 | |
| FZ 26 | 10% add. | 986 | 3070 | 1002 | 1020 | |
| weighted mean | | 980 | 3155 | 969 | 912 | 29 |
| FZ 33 | 14% add. | 956 | 3337 | 984 | 746 | |
| FZ 34 | 14% add. | 983 | 3821 | 1018 | 726 | |
| FZ 35 | 14% add. | 987 | 3596 | 1030 | 747 | |
| FZ 36 | 14% add. | 873 | 2664 | 925 | 1115 | |
| weighted mean | | 950 | 3584 | 989 | 869 | 24 |
| FZ 43 | 18% add. | 947 | 3463 | 987 | 680 | |
| FZ 44 | 18% add. | 962 | 3460 | 961 | 702 | |
| FZ 45 | 18% add. | 994 | 4109 | 1054 | 684 | |
| FZ 46 | 18% add. | 915 | 3298 | 1006 | 618 | |
| weighted mean | | 955 | 3677 | 1002 | 689 | 19 |

TABLE 14

Thickness swell and linear expansion from manufacture to 65% r.h.

| Board from Ex Ref No. | Type | Thickness swell % | Linear expansion % |
|---|---|---|---|
| FZ 3 | control | 3 | 0.2 |
| FZ 4 | control | 3 | 0.0 |
| FZ 5 | control | 3 | 0.2 |
| FZ 6 | control | 3 | 0.2 |
| mean | | 2.9 | 0.16 |
| FZ 12 | 10% mod. | 3 | 0.4 |
| FZ 13 | 10% mod. | 2 | 0.3 |
| FZ 14 | 10% mod. | 3 | 0.3 |
| FZ 15 | 10% mod. | 3 | 0.3 |
| mean | | 2.6 | 0.34 |
| FY 87 | 14% mod. | | |
| FY 88 | 14% mod. | 0.4 | |
| FY 89 | 14% mod. | 2 | 0.3 |
| FY 90 | 14% mod. | 3 | 0.4 |
| mean | | 2.4 | 0.35 |
| FY 93 | 18% mod. | | |
| FY 94 | 18% mod. | 2 | 0.2 |
| FY 95 | 18% mod. | 1 | 0.3 |
| FY 96 | 18% mod. | 1 | −0.0 |
| mean | | 1.6 | 0.17 |
| FX 23 | 10% add. | 2 | 0.0 |
| FZ 24 | 10% add. | 1 | 0.0 |
| FZ 25 | 10% add. | 0 | 0.1 |
| FZ 26 | 10% add. | −0 | 0.0 |
| mean | | 0.8 | 0.03 |
| FZ 33 | 14% add. | 0 | 0.2 |
| FZ 34 | 14% add. | 0 | 0.1 |
| FZ 35 | 14% add. | 0 | 0.0 |
| FZ 36 | 14% add. | 0 | 0.1 |
| mean | | 0.3 | 0.12 |
| FZ 43 | 18% add. | −0 | 0.1 |
| FZ 44 | 18% add. | −0 | 0.1 |

TABLE 14-continued

Thickness swell and linear expansion from manufacture to 65% r.h.

| Board from Ex Ref No. | Type | Thickness swell % | Linear expansion % |
|---|---|---|---|
| FZ 45 | 18% add. | −1 | 0.1 |
| FZ 46 | 18% add. | −0 | 0.2 |
| mean | | −0.3 | 0.13 |

TABLE 15

Weight gain, thickness swell and linear expansion from 65% r.h. to 93% r.h.

| Board from Ex Ref No. | Type | Weight gain % | Thickness swell % | Linear expansion % |
|---|---|---|---|---|
| FZ 3 | control | 5.5 | 6.1 | 0.10 |
| FZ 4 | control | 3.5 | 3.6 | −0.10 |
| FZ 5 | control | 4.7 | 5.2 | 0.15 |
| FZ 6 | control | 4.3 | 4.9 | 0.00 |
| mean | | 4.5 | 5.0 | 0.04 |
| FZ 12 | 10% mod. | 3.3 | 3.5 | 0.15 |
| FZ 13 | 10% mod. | 4.3 | 4.4 | 0.15 |
| FZ 14 | 10% mod. | 3.7 | 3.4 | −0.05 |
| FZ 15 | 10% mod. | 3.7 | 3.2 | −0.10 |
| mean | | 3.7 | 3.6 | 0.04 |
| FY 87 | 14% mod. | 3.8 | 3.1 | 0.05 |
| FY 88 | 14% mod. | 2.9 | 2.5 | −0.25 |
| FY 89 | 14% mod. | 3.7 | 3.0 | 0.00 |
| FY 90 | 14% mod. | 3.6 | 3.0 | 0.20 |
| mean | | 3.5 | 2.9 | 0.00 |
| FY 93 | 18% mod. | 3.0 | 2.3 | −0.10 |
| FY 94 | 18% mod. | 2.4 | 1.6 | −0.10 |
| FY 95 | 18% mod. | 3.8 | 2.9 | −0.05 |
| FY 96 | 18% mod. | 2.5 | 2.0 | 0.05 |
| mean | | 2.9 | 2.2 | −0.05 |
| FZ 23 | 10% add. | 4.9 | 3.8 | 0.25 |
| FZ 24 | 10% add. | 5.1 | 3.9 | 0.40 |
| FZ 25 | 10% add. | 6.0 | 5.1 | 0.30 |
| FZ 26 | 10% add. | 5.0 | 3.8 | 0.25 |
| mean | | 5.3 | 4.1 | 0.30 |
| FZ 33 | 14% add. | 5.5 | 4.6 | 0.40 |
| FZ 34 | 14% add. | 4.6 | 3.6 | 0.25 |
| FZ 35 | 14% add. | 4.0 | 4.0 | 0.30 |
| FZ 36 | 14% add. | 4.7 | 3.4 | 0.30 |
| mean | | 4.7 | 3.9 | 0.31 |
| FZ 43 | 18% add. | 5.3 | 4.6 | 0.25 |
| FZ 44 | 18% add. | 5.2 | 4.0 | 0.20 |
| FZ 45 | 18% add. | 5.0 | 3.6 | 0.40 |
| FZ 46 | 18% add. | 5.3 | 4.3 | 0.40 |
| mean | | 5.2 | 4.1 | 0.31 |

TABLE 16

Weight gain, thickness swell and linear expansion from 65% r.h. to 1 hour 20° C. soak

| Board from Ex Ref No. | Type | density Kg/m³ | Weight gain % | Thickness swell % | Linear expansion % |
|---|---|---|---|---|---|
| FZ 3 | control | 987 | 4.8 | 3.3 | 0.35 |
| FZ 4 | control | 1034 | 4.4 | 3.3 | −0.10 |
| FZ 5 | control | 1031 | 4.2 | 3.4 | −0.05 |
| FZ 6 | control | 1027 | 4.5 | 3.5 | 0.15 |
| mean | | 1020 | 4.5 | 3.3 | 0.09 |
| FZ 12 | 10% mod. | 967 | 3.7 | 2.3 | 0.15 |
| FZ 13 | 10% mod. | 1005 | 2.7 | 1.9 | −0.05 |
| FZ 14 | 10% mod. | 959 | 3.7 | 1.9 | 0.10 |
| mean | | 977 | 3.3 | 2.0 | 0.07 |
| FY 87 | 14% mod. | 965 | 2.1 | 1.0 | 0.05 |
| FY 88 | 14% mod. | 980 | 1.6 | 0.9 | 0.00 |
| FY 89 | 14% mod. | 972 | 2.5 | 1.4 | −0.05 |
| FY 90 | 14% mod. | 998 | 2.0 | 1.1 | −0.05 |
| mean | | 979 | 2.1 | 1.1 | −0.01 |
| FY 93 | 18% mod. | 966 | 1.4 | 0.5 | 0.00 |
| FY 94 | 18% mod. | 999 | 1.7 | 0.6 | −0.05 |
| FY 95 | 18% mod. | 1003 | 1.5 | 0.7 | −0.10 |
| FY 96 | 18% mod. | 1024 | 1.5 | 0.9 | 0.00 |
| mean | | 998 | 1.5 | 0.7 | −0.04 |
| FZ 23 | 10% add. | 971 | 1.9 | 0.8 | −0.10 |
| FZ 24 | 10% add. | 973 | 2.3 | 0.8 | −0.15 |
| FZ 25 | 10% add. | 973 | 4.6 | 1.4 | −0.05 |
| FZ 26 | 10% add. | 1013 | 2.2 | 1.2 | −0.15 |
| mean | | 983 | 2.7 | 1.1 | −0.11 |
| FZ 33 | 14% add. | 1039 | 1.1 | 0.4 | 0.15 |
| FZ 34 | 14% add. | 993 | 2.1 | 0.9 | −0.30 |
| FZ 35 | 14% add. | 1014 | 1.5 | 0.5 | 0.25 |
| FZ 36 | 14% add. | 976 | 1.9 | 0.7 | −0.05 |
| mean | | 1006 | 1.7 | 0.6 | 0.01 |
| FZ 43 | 18% add. | 989 | 1.0 | 0.5 | −0.35 |
| FZ 44 | 18% add. | 998 | 1.6 | 0.2 | 0.15 |
| FZ 45 | 18% add. | 1033 | 1.7 | 0.4 | −0.10 |
| FZ 46 | 18% add. | 1012 | 1.1 | 0.4 | 0.00 |
| mean | | 1008 | 1.3 | 0.4 | −0.07 |

TABLE 17

Weight gain, thickness smell and linear expansion from 65% r.h. to 42 hour 20° C. soak

| Board from Ex Ref No. | Type | density Kg/m³ | Weight gain % | Thickness swell % | Linear expansion % |
|---|---|---|---|---|---|
| FZ 3 | control | 987 | 22.6 | 8.7 | 0.25 |
| FZ 4 | control | 1034 | 20.1 | 9.4 | 0.30 |
| FZ 5 | control | 1031 | 23.6 | 9.5 | 0.30 |
| FZ 6 | control | 1027 | 21.6 | 10.4 | 0.45 |
| mean | | 1020 | 22.0 | 9.5 | 0.32 |
| FZ 12 | 10% mod. | 967 | 15.4 | 4.3 | 0.30 |
| FZ 13 | 10% mod. | 1005 | 11.9 | 5.6 | −0.05 |
| FZ 14 | 10% mod. | 959 | 15.1 | 5.1 | 0.00 |
| mean | | 977 | 14.1 | 5.0 | 0.08 |
| FY 87 | 14% mod. | 965 | 10.1 | 3.0 | 0.00 |
| FY 88 | 14% mod. | 980 | 7.6 | 2.8 | 0.10 |
| FY 89 | 14% mod. | 972 | 11.2 | 3.9 | 0.05 |
| FY 90 | 14% mod. | 998 | 9.5 | 3.4 | 0.15 |
| mean | | 979 | 9.6 | 3.3 | 0.07 |
| FY 93 | 18% mod. | 966 | 6.9 | 2.5 | 0.25 |
| FY 94 | 18% mod. | 999 | 7.3 | 2.4 | 0.10 |
| FY 95 | 18% mod. | 1003 | 6.2 | 2.2 | 0.15 |
| FY 96 | 18% mod. | 1024 | 6.7 | 2.7 | 0.00 |
| mean | | 998 | 6.8 | 2.5 | 0.12 |
| FZ 23 | 10% add. | 971 | 12.7 | 4.8 | 0.05 |
| FZ 24 | 10% add. | 973 | 12.6 | 4.5 | 0.10 |
| FZ 25 | 10% add. | 973 | 15.6 | 6.9 | 0.10 |
| FZ 26 | 10% add. | 1013 | 9.7 | 4.6 | 0.10 |
| mean | | 983 | 12.7 | 5.2 | 0.09 |
| FZ 33 | 14% add. | 1039 | 8.1 | 4.7 | 0.05 |
| FZ 34 | 14% add. | 993 | 10.9 | 4.7 | −0.05 |
| FZ 35 | 14% add. | 1014 | 8.9 | 4.5 | 0.20 |
| FZ 36 | 14% add. | 976 | 11.7 | 4.4 | 0.25 |
| mean | | 1006 | 9.9 | 4.6 | 0.11 |
| FZ 43 | 18% add. | 989 | 8.2 | 4.2 | 0.05 |
| FZ 44 | 18% add. | 998 | 10.6 | 4.5 | 0.25 |
| FZ 45 | 18% add. | 1033 | 8.4 | 3.9 | 0.10 |
| FZ 46 | 18% add. | 1012 | 7.2 | 3.8 | 0.10 |
| mean | | 1008 | 8.6 | 4.1 | 0.12 |

TABLE 18

Weight gain, thickness swell and linear expansion from 65% r.h. to 2 hour boil

| Board from Ex Ref No. | Type | Weight gain % | Thickness swell % | Linear expansion % |
|---|---|---|---|---|
| FZ 3 | control | 83.4 | 48.4 | 0.65 |
| FZ 4 | control | 98.7 | 65.0 | 1.05 |
| FZ 5 | control | 89.0 | 54.7 | 1.25 |
| FZ 6 | control | 101.8 | 62.7 | 0.95 |
| mean | | 93.2 | 57.7 | 0.97 |
| FZ 12 | 10% mod. | 60.9 | 21.4 | 0.35 |
| FZ 13 | 10% mod. | 52.2 | 20.7 | 0.20 |
| FZ 14 | 10% mod. | 54.5 | 18.5 | 0.25 |

TABLE 18-continued

Weight gain, thickness swell and linear expansion from 65% r.h. to 2 hour boil

| Board from Ex Ref No. | Type | Weight gain % | Thickness swell % | Linear expansion % |
|---|---|---|---|---|
| FZ 15 | 10% mod. | 53.5 | 18.3 | 0.30 |
| mean | | 55.3 | 19.8 | 0.27 |
| FY 87 | 14% mod. | 51.6 | 16.3 | 0.20 |
| FY 88 | 14% mod. | 40.7 | 14.7 | −0.05 |
| FY 89 | 14% mod. | 41.5 | 16.1 | 0.30 |
| FY 90 | 14% mod. | 44.3 | 15.5 | 0.35 |
| mean | | 44.5 | 15.6 | 0.20 |
| FY 93 | 18% mod. | 42.7 | 13.0 | 0.20 |
| FY 94 | 18% mod. | 42.9 | 13.3 | 0.40 |
| FY 95 | 18% mod. | 39.9 | 14.0 | 0.20 |
| FY 96 | 18% mod. | 45.4 | 14.7 | 0.50 |
| mean | | 42.7 | 13.8 | 0.32 |
| FZ 23 | 10% add. | 51.2 | 18.8 | 0.30 |
| FZ 24 | 10% add. | 43.4 | 19.6 | 0.40 |
| FZ 25 | 10% add. | 42.8 | 19.1 | 0.30 |
| FZ 26 | 10% add. | 45.8 | 19.7 | 0.30 |
| mean | | 45.8 | 19.3 | 0.32 |
| FZ 33 | 14% add. | 44.8 | 20.6 | 0.35 |
| FZ 34 | 14% add. | 39.8 | 19.9 | 0.45 |
| FZ 35 | 14% add. | 40.6 | 18.2 | 0.40 |
| FZ 36 | 14% add. | 50.7 | 17.2 | 0.40 |
| mean | | 44.0 | 19.0 | 0.40 |
| FZ 43 | 18% add. | 45.2 | 20.0 | 0.35 |
| FZ 44 | 18% add. | 47.3 | 17.5 | 0.45 |
| FZ 45 | 18% add. | 35.2 | 16.9 | 0.40 |
| FZ 46 | 18% add. | 42.5 | 20.5 | 0.45 |
| mean | | 42.6 | 18.7 | 0.41 |

TABLE 19

Expansion and weight gain - V313 cyclical testing

| Board from Ex Ref No. | Type | density Kg/m³ | Weight gain % | Thickness swell % | Linear expansion % |
|---|---|---|---|---|---|
| FZ 3 | control | 986 | 17.7 | 0.08 | 0.90 |
| FZ 4 | control | 1022 | 20.9 | 0.14 | 0.81 |
| FZ 5 | control | 1027 | 13.1 | 0.11 | 0.89 |
| FZ 6 | control | 985 | 26.5 | 0.18 | 0.56 |
| mean | | 1005 | 19.6 | 0.13 | 0.79 |
| FZ 12 | 10% mod. | 953 | 8.8 | −0.15 | 0.07 |
| FZ 13 | 10% mod. | 990 | 5.2 | −0.08 | 0.26 |
| FZ 14 | 10% mod. | 948 | 5.8 | −0.11 | 0.04 |
| FZ 15 | 10% mod. | 991 | 4.5 | −0.11 | 0.37 |
| mean | | 971 | 6.1 | −0.11 | 0.18 |
| FY 87 | 14% mod. | 940 | 3.7 | −0.08 | −0.04 |
| FY 88 | 14% mod. | 1015 | 1.9 | −0.10 | 0.00 |
| FY 89 | 14% mod. | 1025 | 3.4 | −0.13 | −0.07 |
| FY 90 | 14% mod. | 1037 | 2.0 | −0.15 | −0.36 |
| mean | | 1004 | 2.8 | −0.12 | −0.12 |
| FY 93 | 18% mod. | 994 | 2.0 | −0.10 | −0.33 |
| FY 94 | 18% mod. | 1007 | 2.3 | −0.09 | −0.22 |
| FY 95 | 18% mod. | 1033 | 1.8 | −0.14 | −0.51 |
| FY 96 | 18% mod. | 1006 | 1.9 | −0.10 | −0.53 |
| mean | | 1010 | 2.0 | −0.11 | −0.39 |
| FZ 23 | 10% add. | 980 | 6.5 | −0.17 | 0.34 |
| FZ 24 | 10% add. | 989 | 4.9 | −0.25 | 0.07 |
| FZ 25 | 10% add. | 932 | 6.6 | −0.13 | −1.33 |
| FZ 26 | 10% add. | 1001 | 3.8 | −0.17 | −0.56 |
| mean | | 976 | 5.4 | −0.18 | −0.37 |
| FZ 33 | 14% add. | 983 | 4.8 | −0.22 | 0.11 |
| FZ 34 | 14% add. | 1008 | 6.7 | −0.32 | −0.38 |
| FZ 35 | 14% add. | 1032 | 4.2 | −0.29 | −0.96 |
| FZ 36 | 14% add. | 896 | 4.7 | −0.19 | −0.41 |
| mean | | 980 | 5.1 | −0.26 | −0.41 |
| FZ 43 | 18% add. | 970 | 4.3 | −0.17 | −0.35 |
| FZ 44 | 18% add. | 989 | 4.0 | −0.20 | −0.30 |
| FZ 45 | 18% add. | 1031 | 4.2 | −0.35 | −1.70 |
| FZ 46 | 18% add. | 966 | 5.3 | −0.22 | −0.76 |
| mean | | 989 | 4.5 | −0.24 | −0.78 |

TABLE 20

Expansion and weight gain - non-standard cyclic testi

| Board from Ex Ref No. | Type | density Kg/m³ | Weight gain % | Thickness swell % | Linear expansion % |
|---|---|---|---|---|---|
| FZ 3 | control | 975 | 15.8 | 0.11 | 5.4 |
| FZ 4 | control | 1031 | 20.5 | 0.12 | 4.7 |
| FZ 5 | control | 1004 | 20.5 | 0.03 | 4.9 |
| FZ 6 | control | 997 | 23.1 | 0.22 | 4.6 |
| mean | | 1001 | 20.0 | 0.12 | 4.9 |
| FZ 12 | 10% mod. | 926 | 5.0 | −0.33 | 8.0 |
| FZ 13 | 10% mod. | 996 | 5.2 | −0.39 | 6.6 |
| FZ 14 | 10% mod. | 953 | 4.2 | −0.47 | 7.5 |
| FZ 15 | 10% mod. | 970 | 4.9 | −0.55 | 6.8 |
| mean | | 961 | 4.8 | −0.44 | 7.2 |
| FY 87 | 14% mod. | 906 | 2.9 | −0.57 | 9.2 |
| FY 88 | 14% mod. | 1015 | 1.1 | −0.58 | 6.7 |
| FY 89 | 14% mod. | 1029 | 2.9 | −0.63 | 7.0 |
| FY 90 | 14% mod. | 1002 | 0.9 | −0.72 | 7.7 |
| mean | | 988 | 1.9 | −0.63 | 7.7 |
| FY 93 | 18% mod. | 970 | −0.6 | −0.68 | 9.0 |
| FY 94 | 18% mod. | 980 | 1.1 | −0.71 | 8.4 |
| FY 95 | 18% mod. | 994 | −0.6 | −0.64 | 7.9 |
| FY 96 | 18% mod. | 972 | 0.9 | −0.55 | 8.7 |
| mean | | 979 | 0.2 | −0.65 | 8.5 |
| FZ 23 | 10% add. | 959 | 4.1 | −0.58 | 7.2 |
| FZ 24 | 10% add. | 998 | 3.1 | −0.52 | 6.3 |
| FZ 25 | 10% add. | 919 | 2.1 | −0.60 | 9.0 |
| FZ 26 | 10% add. | 1002 | 3.0 | −0.57 | 6.7 |
| mean | | 969 | 3.1 | −0.57 | 7.3 |
| FZ 33 | 14% add. | 984 | 3.3 | −0.72 | 7.4 |
| FZ 34 | 14% add. | 1018 | 2.3 | −0.52 | 7.5 |
| FZ 35 | 14% add. | 1030 | 2.6 | −0.52 | 7.8 |
| FZ 36 | 14% add. | 925 | 0.5 | −0.70 | 8.9 |
| mean | | 989 | 2.2 | −0.62 | 7.9 |
| FZ 43 | 18% add. | 987 | 2.2 | −0.54 | 9.3 |
| FZ 44 | 18% add. | 961 | 0.7 | −0.67 | 9.9 |
| FZ 45 | 18% add. | 1054 | 0.5 | −0.60 | 10.6 |
| FZ 46 | 18% add. | 1006 | 1.3 | −0.70 | 8.8 |
| mean | | 1002 | 1.2 | −0.63 | 9.7 |

TABLE 21

Oven dry thickness swell - non-standard cyclic testing

| Board from Ex Ref No. | Type | density Kg/m³ | cycle 1 % | cycle 2 % | cycle 3 % | cycle 4 % | cycle 5 % |
|---|---|---|---|---|---|---|---|
| FZ 3 | control | 975 | 10.3 | 13.5 | 15.1 | 15.7 | 15.3 |
| FZ 4 | control | 1031 | 13.6 | 17.4 | 18.5 | 19.5 | 19.9 |
| FZ 5 | control | 1004 | 10.5 | 14.8 | 16.2 | 16.6 | 16.3 |
| FZ 6 | control | 997 | 15.5 | 18.1 | 20.6 | 22.7 | 22.1 |
| mean | | 1001 | 12.5 | 15.9 | 17.6 | 18.6 | 18.4 |
| FZ 12 | 10% mod. | 926 | 6.1 | 6.3 | 5.8 | 5.2 | 5.3 |
| FZ 13 | 10% mod. | 996 | 4.8 | 5.4 | 5.3 | 4.7 | 5.6 |
| FZ 14 | 10% mod. | 953 | 5.1 | 5.6 | 5.6 | 4.9 | 4.7 |
| FZ 15 | 10% mod. | 970 | 4.5 | 4.1 | 5.6 | 5.5 | 5.3 |
| mean | | 961 | 5.1 | 5.3 | 5.6 | 5.1 | 5.2 |
| FY 87 | 14% mod. | 906 | 3.3 | 3.0 | 2.1 | 1.8 | 1.5 |
| FY 88 | 14% mod. | 1015 | 2.1 | 1.9 | 1.6 | 1.8 | 1.4 |
| FY 89 | 14% mod. | 1029 | 3.6 | 3.6 | 3.7 | 3.2 | 3.7 |
| FY 90 | 14% mod. | 1002 | 2.5 | 2.4 | 1.8 | 1.8 | 1.9 |
| mean | | 988 | 2.9 | 2.7 | 2.3 | 2.2 | 2.1 |
| FY 93 | 18% mod. | 970 | 0.6 | 0.7 | 0.7 | 0.5 | 0.1 |
| FY 94 | 18% mod. | 980 | 0.9 | 1.1 | 0.7 | 1.2 | 1.8 |
| FY 95 | 18% mod. | 994 | 1.2 | 1.6 | 1.0 | 1.4 | 0.6 |
| FY 96 | 18% mod. | 972 | 0.8 | 1.5 | 1.4 | 0.3 | 0.6 |
| mean | | 979 | 0.9 | 1.2 | 1.0 | 0.8 | 0.8 |
| FZ 23 | 10% add. | 959 | 1.8 | 2.8 | 3.7 | 3.1 | 3.8 |
| FZ 24 | 10% add. | 998 | 4.2 | 4.2 | 5.0 | 3.7 | 3.7 |
| FZ 25 | 10% add. | 919 | 2.6 | 3.1 | 3.7 | 3.4 | 2.9 |
| FZ 26 | 10% add. | 1002 | 2.4 | 3.2 | 3.5 | 3.6 | 3.1 |
| mean | | 969 | 2.7 | 3.3 | 4.0 | 3.4 | 3.4 |
| FZ 33 | 14% add. | 984 | 2.5 | 3.0 | 2.4 | 2.5 | 3.4 |
| FZ 34 | 14% add. | 1018 | 1.3 | 1.7 | 2.0 | 1.4 | 2.4 |
| FZ 35 | 14% add. | 1030 | 2.6 | 2.2 | 2.0 | 2.9 | 3.0 |
| FZ 36 | 14% add. | 925 | 0.9 | 2.4 | 0.8 | 1.2 | 0.8 |
| mean | | 989 | 1.9 | 2.3 | 1.8 | 2.0 | 2.4 |
| FZ 43 | 18% add. | 987 | 2.4 | 2.8 | 2.5 | 2.8 | 2.3 |
| FZ 44 | 18% add. | 961 | 1.3 | 2.4 | 1.7 | 1.1 | 0.9 |
| FZ 45 | 18% add. | 1054 | 1.1 | 2.3 | 2.3 | 2.6 | 1.6 |
| FZ 46 | 18% add. | 1006 | 1.8 | 2.3 | 1.9 | 2.1 | 1.8 |

TABLE 21-continued

Oven dry thickness swell - non-standard cyclic testing

| Board from Ex Ref No. | Type | density Kg/m³ | cycle 1 % | cycle 2 % | cycle 3 % | cycle 4 % | cycle 5 % |
|---|---|---|---|---|---|---|---|
| mean | | 1002 | 1.6 | 2.4 | 2.1 | 2.2 | 1.6 |

TABLE 22

Oven dry weight loss - non-standard cyclic testing

| Board from Ex Ref No. | Type | density Kg/u.m. | cycle 1 % | cycle 2 % | cycle 3 % | cycle 4 % | cycle 5 % |
|---|---|---|---|---|---|---|---|
| FZ 3 | control | 975 | 1.1 | 2.1 | 3.4 | 4.7 | 5.9 |
| FZ 4 | control | 1031 | 0.9 | 1.9 | 3.0 | 3.8 | 4.6 |
| FZ 5 | control | 1004 | 0,9 | 1.9 | 3.0 | 3.9 | 5.4 |
| FZ 6 | control | 997 | 1.0 | 2.1 | 3.2 | 4.1 | 5.2 |
| mean | | 1001 | 1.0 | 2.0 | 3.1 | 4.1 | 5.3 |
| FZ 12 | 10% mod. | 926 | 1.8 | 3.4 | 5.3 | 6.7 | 8.0 |
| FZ 13 | 10% mod. | 996 | 1.5 | 2.9 | 4.5 | 5.6 | 6.4 |
| FZ 14 | 10% mod. | 953 | 1.6 | 3.1 | 5.1 | 6.3 | 7.4 |
| FZ 15 | 10% mod. | 970 | 1.5 | 3.0 | 4.6 | 5.7 | 6.9 |
| mean | | 961 | 1.6 | 3.1 | 4.9 | 6.1 | 7.2 |
| FY 87 | 14% mod. | 906 | 1.8 | 3.6 | 5.8 | 7.3 | 8.9 |
| FY 88 | 14% mod. | 1015 | 1.4 | 2.7 | 4.4 | 5.3 | 6.2 |
| FY 89 | 14% mod. | 1029 | 1.6 | 2.9 | 4.7 | 5.6 | 6.6 |
| FY 90 | 14% mod. | 1002 | 1.7 | 3.3 | 4.9 | 6.2 | 7.3 |
| mean | | 988 | 1.6 | 3.1 | 4.9 | 6.1 | 7.2 |
| FY 93 | 18% mod. | 970 | 1.7 | 3.5 | 5.7 | 7.0 | 8.1 |
| FY 94 | 18% mod. | 980 | 1.6 | 3.4 | 5.4 | 6.5 | 7.7 |
| FY 95 | 18% mod. | 994 | 1.8 | 3.3 | 5.2 | 6.3 | 7.3 |
| FY 96 | 18% mod. | 972 | 1.8 | 3.5 | 5.6 | 6.7 | 7.9 |
| mean | | 979 | 1.7 | 3.4 | 5.5 | 6.6 | 7.7 |
| FZ 23 | 10% add. | 959 | 1.8 | 3.2 | 4.9 | 6.1 | 7.3 |
| FZ 24 | 10% add. | 998 | 1.4 | 2.7 | 4.3 | 5.2 | 6.1 |
| FZ 25 | 10% add. | 919 | 1.8 | 3.9 | 5.8 | 7.3 | 8.6 |
| FZ 26 | 10% add. | 1002 | 1.5 | 2.8 | 4.4 | 5.4 | 6.5 |
| mean | | 969 | 1.6 | 3.2 | 4.8 | 6.0 | 7.2 |
| FZ 33 | 14% add. | 984 | 1.7 | 3.3 | 5.1 | 6.3 | 7.4 |
| FZ 34 | 14% add. | 1018 | 1.6 | 3.0 | 4.8 | 6.0 | 7.0 |
| FZ 35 | 14% add. | 1030 | 1.8 | 3.4 | 5.2 | 6.3 | 7.3 |
| FZ 36 | 14% add. | 925 | 1.9 | 3.6 | 5.6 | 7.3 | 8.7 |
| mean | | 989 | 1.7 | 3.3 | 5.2 | 6.5 | 7.6 |
| FZ 43 | 18% add. | 987 | 2.2 | 4.0 | 6.1 | 7.4 | 9.1 |
| FZ 44 | 18% add. | 961 | 1.8 | 4.4 | 6.5 | 8.0 | 9.2 |
| FZ 45 | 18% add. | 1054 | 2.2 | 4.0 | 6.0 | 7.6 | 9.0 |
| FZ 46 | 18% add. | 1006 | 1.9 | 3.7 | 5.8 | 7.1 | 8.1 |
| mean | | 1002 | 2.0 | 4.0 | 6.1 | 7.5 | 8.9 |

The above results show that the treatment of lignocellulosic materials according to the present invention improves the boards produced therefrom in respect of:

i. Static Bending:
  Both strength and stiffness when dry or wet;
  Toughness when wet; and
  Retention of physical properties when wet.
ii. Internal Bond Strength:
  Dry bond strength
iii. Initial Swell:
  Reducing thickness swell
  Reducing linear expansion
iv. Linear Expansion:
  Reducing linear expansion upon soaking
v. Thickness Swell:
  Reducing thickness swell due to simulated weathering and cold water soaking.
vi. Water Uptake:
  Reducing water uptake due either to cold soak or boiling or to high humidity vii. Cyclical Testing:
  Reducing thickness swell during cyclical boiling.

We claim:

1. A process for modifying lignocellulosic material by a chemical treatment method, said method comprising treating the lignocellulosic material with:
   a. phthalic anhydride and
   b. a thermosetting resin selected from consisting of phenol-formaldehyde resins; urea formaldehyde resins and urethane resins, and hat curing the phthalylated resin-impregnated product so formed.

2. A process according to claim 1 wherein the lignocellulosic material is a form of wood selected from the group consisting of chips, flakes, splinters, strands, shreds, shives and fibres.

3. A process according to claim 1 wherein each of phthalic anhydride and the thermosetting resin are in the same or different form of a powdered solid, or, a solution or a dispersion in the same solvent or different compatible solvents.

4. A process according to claim 1 wherein the phthalic anhydride used for treating the lignocellulosic material is in the solid form.

5. A process according to claim 1 wherein the amount of phthalic anhydride used is 1 to 50% by weight of the lignocellulosic material.

6. A process as claimed in claim 1, wherein the lignocellulosic material is treated sequentially with said phthalic anhydride and said thermosetting resin.

7. A process as claimed in claim 1, wherein the lignocellulosic material is treated simultaneously with said phthalic anhydride and said thermosetting resin.

8. A process according to any one of the preceding claims wherein the lignocellulosic material is sequentially treated by bringing the material into contact with phthalic anhydride at elevated temperature and the phthalylated material so formed is impregnated with a thermosetting resin.

9. A process according to claim 7 wherein the lignocellulosic material is treated with phthalic anhydride by a cooking process carried out at a temperature of at least 100° C.

10. A process according to claim 7 wherein the lignocellulosic material is treated with phthalic anhydride until the treated material has acquired a weight gain of at least 15%.

11. A process according to claim 7 wherein the phthalylated lignocellulosic material is dampened with water prior to impregnation thereof with a thermosetting resin in its powder form.

12. A process according to claim 7 wherein the heat curing of the phthalylated, resin-impregnated lignocellulosic material is carried out at a temperature in the range from 150° to 250° C.

13. A process according to claim 7 wherein the heat curing step of the phthalylated, resin-impregnated lignocellulosic material in fibrous or particulate or shredded form is carried out by pressing in a die with a preheated punch to 5.5 ml stops at a temperature of 180° C. to produce a shaped or moulded product.

14. A process according to claim 7 wherein the lignocellulosic material is pre-dried to a constant weight prior to treatment with phthalic anhydride.

* * * * *

UNITED STATES PATENT AND TRADEMARK OFFICE
CERTIFICATE OF CORRECTION

PATENT NO. : 5,385,754
DATED : January 31, 1995
INVENTOR(S) : HAROLD A. EARL and RICHARD J. SALISBURY It is certified that error appears in the above-indentified patent and that said Letters Patent is hereby corrected as shown below:

Item [57]
In the Abstract, line 5 should read "finally heat <u>curing the phthalylated, resin-impregnated product. The</u> lignocellulosic"

Col. 1, l. 6, correct the spelling of "lignocellulosic"

Col. 2, l. 51, change "of" to --or--

Col. 4, l. 24, change "no" to --to--

Col. 5, Table 2, under the column headed "Name" change "CT9" to --CT 5--

Col. 7, l. 7, Table 4, correct the spelling of "p<u>h</u>thalic"
Column 20,
Claim 1, line 5, after "from" and before "consisting" insert --the group--

Col. 20, claim 1, line 10, correct the spelling of "heat"
Col. 20,
Claim 13, line 5, change "ml" to --mm--

Signed and Sealed this

Sixth Day of June, 1995

BRUCE LEHMAN

Attest:

*Attesting Officer*     *Commissioner of Patents and Trademarks*